(12) United States Patent
Juestel et al.

(10) Patent No.: US 6,777,879 B2
(45) Date of Patent: Aug. 17, 2004

(54) GAS DISCHARGE LAMP COMPRISING A PHOSPHOR LAYER

(75) Inventors: Thomas Juestel, Aachen (DE);
Wolfgang Busselt, Roetgen (DE);
Claus Feldmann, Aachen (DE); Walter Mayr, Alsdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/169,961

(22) PCT Filed: Nov. 21, 2001

(86) PCT No.: PCT/EP01/13637
§ 371 (c)(1),
(2), (4) Date: Jul. 11, 2002

(87) PCT Pub. No.: WO02/43106
PCT Pub. Date: May 30, 2002

(65) Prior Publication Data
US 2002/0190669 A1 Dec. 19, 2002

(30) Foreign Application Priority Data
Nov. 21, 2000 (DE) .......................... 100 57 881

(51) Int. Cl.$^7$ .............................................. H01J 13/46
(52) U.S. Cl. .................. 315/59; 315/291; 313/491; 313/631; 313/486; 313/494; 252/301.4 P; 252/301.6 P
(58) Field of Search .................. 315/58, 59, 289, 315/291; 252/301.4 R, 301.4 P, 301.4 H, 301.6 P; 313/484–486, 491, 494, 493, 631, 635, 640, 641, 231.71

(56) References Cited
U.S. PATENT DOCUMENTS
3,507,802 A   4/1970  Amster .................... 252/301.4

4,825,127 A * 4/1989 Krasko et al. ............... 313/638
5,376,303 A * 12/1994 Royce et al. ......... 252/301.4 R
6,010,644 A * 1/2000 Fu et al. ............... 252/301.4 R
6,037,714 A * 3/2000 Mehrotra et al. ........... 313/631
6,060,828 A * 5/2000 Vollkommer et al. ....... 313/607
6,376,989 B1 * 4/2002 Vollkommer et al. ....... 315/274
6,398,970 B1 * 6/2002 Justel et al. ................ 210/748
6,402,987 B1 * 6/2002 Srivastava et al. .... 252/301.4 R
6,436,313 B1 * 8/2002 Srivastava et al. .... 252/301.4 P
6,469,435 B1 * 10/2002 Seibold et al. ............. 313/493
6,504,320 B2 * 1/2003 Feldmann et al. .......... 315/289

FOREIGN PATENT DOCUMENTS

| EP | 0200279 A2 | 4/1986 |
| EP | 0877071 A1 | 3/1998 |
| GB | 1289552 | 9/1969 |
| NL | 8302536 | 4/1983 |

OTHER PUBLICATIONS

"Ullmans Enzyklopadie der technischen Chemie", 16, 195 (1978), Weinheim.

* cited by examiner

Primary Examiner—Haissa Philogene

(57) ABSTRACT

The invention relates to a gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, which phosphor layer comprises a phosphor having a host lattice, $Eu^{2+}$ as the activator and a doping D selected from the group formed by $Ce^{3+}$, $Pr^{3+}$ and $Tb^{3+}$, and provided with an electrode structure for a dielectrically impeded discharge and means for igniting and maintaining the discharge. The invention also relates to a phosphor comprising a host lattice, $Eu^{2+}$ as the activator and a doping D selected from the group formed by $Ce^{3+}$, $Pr^{3+}$ and $Tb^{3+}$.

7 Claims, 1 Drawing Sheet

GAS DISCHARGE LAMP COMPRISING A PHOSPHOR LAYER

Figure 1:
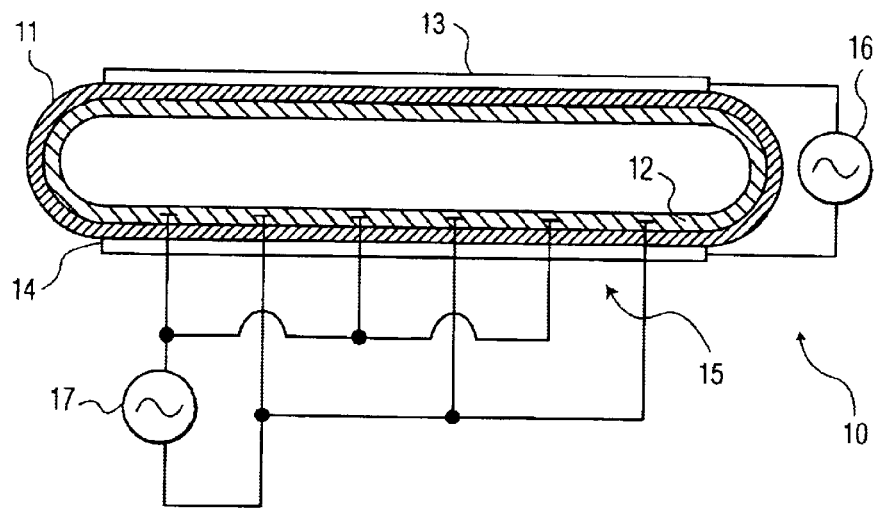

The invention relates to a gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, and provided with an electrode structure for a dielectrically impeded discharge, and with means for igniting and maintaining the dielectrically impeded discharge.

Gas discharge lamps for dielectrically impeded discharges are used, particularly, in office automation devices, for example color copiers and color scanners, in signal devices, for example as brake lights and direction indicator lights in automobiles, in auxiliary illumination devices, for example, the courtesy lighting of automobiles, as well as, in particular, for the background lighting of displays and display screens, for example of liquid crystal displays.

Said applications require the luminance to be both uniform throughout the length of the lamp and high. To increase the luminance, it is necessary to increase the power that is coupled into the system. However, this also causes a higher load to be imposed on, inter alia, the phosphors in the phosphor layer. The phosphors degrade more rapidly and the luminous output decreases more rapidly during operation as the power coupled in increases.

In particular gas discharge lamps for dielectrically impeded discharges comprising phosphors containing $Eu^{2+}$ as the activator are adversely affected by said degradation of the phosphors. Phosphors comprising $Eu^{2+}$ as the activator are disclosed in "Ullmans Enzyklopädie der technischen Chemie", 16, 195 (1978), Weinheim.

Therefore, it is an object of the invention to provide a gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, which phosphor layer comprises a phosphor containing $Eu^{2+}$ as the activator, and which gas discharge lamp is also provided with an electrode structure for a dielectrically impeded discharge, and with means for igniting and maintaining the dielectrically impeded discharge, in which gas discharge lamp degradation of the phosphor is reduced.

In accordance with the invention, this object is achieved by a gas discharge lamp for dielectrically impeded discharges, which gas discharge lamp is provided with a discharge vessel filled with a gas filling, which discharge vessel comprises at least a wall of a dielectric material and at least a wall having a surface which is at least partly transparent to visible radiation and coated with a phosphor layer, which phosphor layer comprises a phosphor having a host lattice, $Eu^{2+}$ as the activator and a doping D selected from the group formed by $Ce^{3+}$, $Pr^{3+}$ and $Tb^{3+}$, and provided with an electrode structure for a dielectrically impeded discharge and means for igniting and maintaining the discharge.

In a gas discharge lamp with a phosphor layer, which comprises a phosphor with $Eu^{2+}$ as the activator and a doping D selected from the group formed by $Ce^{3+}$, $Pr^{3+}$ and $Tb^{3+}$, the degradation of the phosphor is reduced and the color point of the lamp remains unchanged.

The invention is based on the recognition that the degradation of phosphors comprising $Eu^{2+}$ as the activator in gas discharge lamps for dielectrically impeded discharges due to photo-oxidation of said $Eu^{2+}$ is caused by the VUV radiation from the gas discharge lamp having a wavelength in the range from 100 to 200 nm, whereas excitation by means of light having a longer wavelength in the range from 200 to 400 nm does not lead to any observable loss in efficiency. It has been found that this photo-oxidation of the $Eu^{2+}$ ion can be precluded by adding further dopants, such as $Ce^{3+}$, $Pr^{3+}$ and $Tb^{3+}$ to the phosphor, said dopants being themselves photo-oxidizable.

In accordance with a preferred embodiment of the invention, the host lattice is composed of an inorganic material selected from the group formed by oxides, sulphides, halogenides, aluminates, gallates, thiogallates, phosphates, borates and silicates.

It is particularly preferred that the phosphor is selected from the group formed by $BaMgAl_{10}O_{17}:Eu^{2+},D$; $BaMgAl_{10}O_{17}:Eu^{2+},Mn,D$; $(Sr,Ba)MgAl_{10}O_{17}:Eu^{2+},D$; $BaMgAl_{16}O_{27}:Eu^{2+},D$; $BaMgAl_{14}O_{23}:Eu^{2+},D$; $CaAl_{12}O_{19}:Eu^{2+}D$; $SrAl_{12}O_{19}:Eu^{2+},D$; $SrAl_2O_4:Eu^{2+},D$; $(Ca,Sr,Ba)_5(PO_4)_3Cl:Eu^{2+},D$; $Sr_5(PO_4)_3Cl:Eu^{2+},D$; $Ba_3MgSi_2O_8Eu^{2+},D$; $BaF(Cl,Br):Eu^{2+},D$ and $SrGa_2S_4:Eu^{2+},D$.

Within the scope of the invention, it is preferred that the phosphor layer comprises $BaMgAl_{10}O_{17}:Eu^{2+},D$; $Zn_2SiO_4:Mn$ and $(Y,Gd)BO_3:Eu^{3+}$.

It may alternatively preferred that the phosphor layer comprises $BaMgAl_{10}O_{17}:Eu^{2+},D$; $(Y,Gd)BO_3:Tb^{3+}$ and $(Y,Gd)BO_3:Eu^{3+}$.

The invention further relates to a phosphor comprising a host lattice, $Eu^{2+}$ as the activator and a doping D selected from the group formed by $Ce^{3+}$, $Pr^{3+}$ and $Tb^{3+}$. Such a phosphor can also be advantageously used for the phosphor layer of colored plasma display screens.

These and other aspects of the invention will be apparent from and elucidated with reference to two embodiments described hereinafter.

Figure 2:
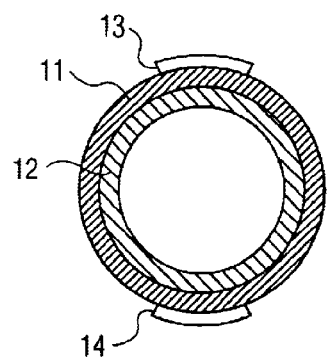

FIG. 1 illustrates one embodiment of a gas discharge lamp in accordance with the present invention; and FIG. 2 illustrates a cross-section of the gas discharge lamp illustrate in FIG. 1.

Referring to FIGS. 1 and 2, a gas discharge lamp for dielectrically impeded discharges in accordance with the invention comprises a discharge vessel 10 containing a gas filling which discharge vessel comprises at least a wall 11 of a dielectric material and at least a wall 12 having a surface which is at least partly transparent to visible radiation and coated with a phosphor layer. The phosphor layer includes a phosphor preparation including a phosphor of an inorganic crystalline host lattice, the luminosity of said phosphor being obtained by activating it using an $Eu^{2+}$ dopant. In addition, the gas discharge lamp is provided with an electrode structure 13–15 for a dielectrically impeded discharge and with AC sources 16 and 17 for igniting and maintaining the dielectrically impeded discharge. The electrode structure can further include an inner electrode (nor shown), such as, for example, a rod.

A typical construction of the gas discharge lamp comprises a cylindrical, xenon-filled lamp bulb of glass whose outer wall is provided with a pair of stripe-shaped electrodes 13 and 14 which are arranged so as to be electrically isolated from each other. The stripe-shaped electrodes 13 and 14 extend throughout the length of the lamp bulb so as to face each other with their long sides, while leaving two gaps clear. The electrodes 13 and 14 are connected to the poles of a high-voltage source 16, which is operated at an alternating voltage of the order of 20 kHz w 500 kHz in such manner that an electric discharge develops only in the region of the inside surface of the lamp bulb.

If an AC voltage is applied to the electrodes, a corona discharge can be ignited in the xenon-containing filling gas. This leads to the formation of excimers in the xenon, i.e. molecules which consist of an excited xenon atom and a xenon atom in the ground state.

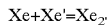

The excitation energy is delivered as UV radiation having a wavelength $\lambda=160$ to 190 nm. This conversion of electron energy to UV radiation takes place very efficiently. The generated UV photons are absorbed by the phosphors of the phosphor layer and the excitation energy is partly delivered again in the region of the spectrum having a longer wavelength.

In principle, a plurality of different structural shapes are possible for the discharge vessel, such as plates, simple tubes, coaxial tubes, straight, U-shaped, circularly bent or coiled cylindrical, or differently shaped, discharge tubes.

As the material for the discharge vessel use is made of quartz or glass types.

The electrodes consist of, for example, a metal, such as aluminum or silver, a metal alloy or a transparent, conductive, inorganic compound, for example ITO. They can be embodied so as to be a coating, an adhesive foil, wire or wire netting.

To concentrate the light intensity in a specific direction, a part of the discharge vessel may be provided with a coating serving as a reflector for VUV and UV-C light.

The discharge vessel is filled with a gas mixture comprising an inert gas such as xenon, krypton, neon or helium. Gas fillings comprising predominantly oxygen-free xenon are preferred.

The inner wall of the gas discharge vessel is partly, or entirely, coated with a phosphor layer containing one or more phosphors or phosphor preparations. In addition, the phosphor layer may comprise organic or inorganic binders or a binder composition.

For the phosphor use is made of a phosphor comprising the $Eu^{2+}$ ion as the activator in a host lattice. The host lattice may be composed of an inorganic material, such as oxides, sulphides, halogenides, aluminates, gallates, thiogallates, phosphates, borates or silicates, said inorganic material being doped with a few percent of the activator.

The phosphors used in accordance with the invention are first and foremost: $MeMgAl_{10}O_{17}:Eu^{2+},D$ where Me=Ba, Sr having the $\beta$-alumina-crystal structure, for example $BaAl_{10}O_{17}:Eu^{2+},D$ as well as the phosphors having a similar crystal structure, such as $BaMgAl_{16}O_{27}:Eu^{2+},D$ and $BaMgAl_{14}O_{23}:Eu^{2+},D$. In addition, use can be made of aluminate phosphors of magnetoplumbite structure $MeAl_{12}O_{19}:Eu^{2+},D$ where Me is selected from the group formed by Ca, Sr, Ba, for example $BaAl_{12}O_{19}:Eu^{2+},D$. These aluminate phosphors are particularly efficient when they are excited by vacuum-UV radiation.

Particularly preferred phosphors are also the green-luminescent strontium aluminate $SrAl_2O_4:Eu^{2+},D$; strontium chlorophosphate $Sr_5(PO_4)_5Cl:Eu^{2+},D$; barium magnesium silicate $Ba_3MgSi_2O_8:Eu^{2+},D$; barium halogenide BaF (Cl,Br):$Eu^{2+},D$ and strontium thiogallate $SrGa_2S_4:Eu^{2+},D$.

The phosphors activated by $Eu^{2+}$ and doped with Co activators preferably comprise 0.1 to 30 mol. % $Eu^{2+}$ and 0.01 to 5 mol. % of the trivalent Co activators selected from cerium, praseodymium and terbium.

Phosphors comprising $Eu^{2+}$ as the activator can be readily doped with the trivalent Co activators cerium, praseodymium and terbium if, during the manufacture of the phosphors, an oxide selected from the group formed by $CeO_2$, $Pr_6O_{11}$ and $Tb_4O_7$ is added to the starting compounds.

The absorption coefficient of said phosphors is particularly high, and the quantum yield high, for the wavelengths in the xenon radiation range. The host lattice does not take part in the luminescence process, instead it influences the exact position of the energy levels of the activator ion and hence the wavelengths of absorption and emission. As an activator in the different host lattices, the $Eu^{2+}$ ion generally exhibits wide absorption bands in the ultraviolet region which partly extend into the blue region. The emission bands extend from the long ultraviolet up to the yellow-orange region, yet they extend substantially in the blue region. Deionization of these phosphors takes place at a temperature that is approximately slightly above 100° C.

The grain size of the phosphor particles is not critical. Customarily, use is made of phosphors in the form of fine-grain powder having a grain size distribution between 1 and 20 $\mu$m.

For the manufacture of a phosphor layer on a wall of the discharge vessel use can be made of dry coating methods, such as electrostatic deposition or electrostatically assisted powdering, as well as of a wet coating method, such as dip-coating or spraying.

In the case of the wet coating method, the phosphor preparation must be dispersed in water, an organic solvent, if necessary in conjunction with a dispersing agent, a surface active agent and an anti-foaming agent, or a binder preparation. Organic or inorganic binders capable of withstanding an operating temperature of 250° C. without being subject to decomposition, embrittlement or discoloration can suitably be used as the binder preparations for a gas discharge lamp in accordance with the invention.

The phosphor preparation can be applied, for example, to a wall of the discharge vessel by means of a flow-coating process. The coating suspensions used for the flow-coating process comprise water or an organic compound, such as butylacetate, as the solvent. The suspension is stabilized by adding auxiliary agents, such as stabilizers, liquefiers, cellulose derivatives, and influenced in its Theological properties. The phosphor suspension is applied in the form of a thin layer to the walls of the vessel, after which it is dried and fired at 600° C.

It may alternatively be preferred to electrostatically deposit the phosphor preparation for the phosphor layer onto the inside of the discharge vessel.

For a gas discharge lamp for dielectrically impeded discharges, which lamp should emit white light, preferably a green-emitting phosphor of the group formed by $BaMgAl_{10}O_{17}:Eu^{2+},D$; $BaMgAl_{10}O_{17}:Eu^{2+},Mn,D$ and (Ca, Sr,Ba)$_5(PO_4)_3Cl$: $Eu^{2+},D$ is combined with a red-emitting phosphor of the group formed by $(Y,Gd)BO_3:Eu^{3+}$ and $Y(V,P)O_4:Eu^{3+}$ and with a green-emitting phosphor of the group formed by $(Y,Gd)BO_3:Tb^{3+}$ and $Zn_2SiO_4:Mn$.

The layer thickness of the phosphor layer customarily ranges from 5 to 100 $\mu$m.

The vessel is subsequently evacuated so as to remove all gaseous impurities, in particular oxygen. Next, the vessel is filled with xenon and sealed.

EXAMPLE 1

A cylindrical discharge vessel of glass having a length of 590 nm, a diameter of 10 nm and a wall thickness of 0.8 nm is filled with xenon at a pressure of 200 hPa. The discharge vessel comprises an inner electrode, which extends parallel to the axis, and which is in the form of a rod of a noble metal having a diameter of 2.2 mm. The outside surface of the discharge vessel is provided with the outer electrode in the form of two conductive silver strips having a width of 2 mm each, which strips are arranged so as to be parallel to the axis and conductively connected to the power supply. The lamp is operated by means of a pulsed AC voltage. The inside wall of the discharge vessel is coated with a phosphor layer. Said phosphor layer comprises a three-banded phosphor mixture of the following components: $BaMgAl_{10}O_{17}:Eu^{2+},Pr^{3+}$ as the blue component, $Y_2O_3:Eu$ as the red component and $Y_2SiO_5;Tb$ as the green component.

To manufacture said $BaMgAl_{10}O_{17}:Eu^{2+},Pr^{3+}$, 69.3 g (0.350 mol) $BaCO_3$, 7.0 g (0.03 mol) $Eu_2O_3$, 4.0 g (4.0 mol) $Pr_6O_{11}$, 11.2 g (0.278 mol) MgO, 204 g (2.0 mol $Al_2O_3$) and 7.4 g (0.119 mol ) $MgF_2$ are thoroughly mixed and ground in an agate mortar. Said mixture is sintered in a reducing atmosphere of nitrogen with 1% hydrogen at 1300° C. for 2 hours. The sintered powder is ground again and sieved so as to obtain a particle size d<36 $\mu$m.

In this manner a light output of initially 37 lm/W was achieved. After 1000 working hours, the light output was approximately 34 lm/W. The quantum yield for VUV light is approximately 70%.

EXAMPLE 2

A cylindrical discharge vessel of glass having a length of 590 nm, a diameter of 10 nm and a wall thickness of 0.8 nm is filled with xenon at a pressure of 200 hPa. The discharge vessel comprises an inner electrode, which extends parallel to the axis, and which is in the form of a rod of a noble metal having a diameter of 2.2 mm. The outside surface of the discharge vessel is provided with the outer electrode in the form of two conductive silver strips having a width of 2 mm each, which strips are arranged so as to be parallel to the axis and conductively connected to the power supply. The lamp is operated by means of a pulsed AC voltage.

The inside wall of the discharge vessel is coated with a phosphor layer. Said phosphor layer comprises a three-banded phosphor mixture of the following components: $BaMgAl_{10}O_{17}:Eu^{2+},Ce^{3+}$ as the blue component, $(Y,Gd)BO_3:Eu^{3+}$ as the red component and $Zn_2SiO_4:Mn$ as the green component.

To manufacture said $BaMgAl_{10}O_{17}:Eu^{2+},Ce^{3+}$, 69.3 g (0.350 mol) $BaCO_3$, 7.0 g (0.03 mol) $Eu_2O_3$, 4.1 g (24.0 mmol) $CeO_2$, 11.2 g (0.278 mol) MgO, 204 g (2.0 mol $Al_2O_3$) und 7.4 g (0.119 mol ) $MgF_2$ are thoroughly mixed and ground in an agate mortar. Said mixture is sintered in a reducing atmosphere of nitrogen with 1% hydrogen at 1300° C. for 2 hours. The sintered powder is ground again and sieved so as to obtain a particle size d<36 $\mu$m.

In this manner a light output of initially 37 lm/W was achieved. After 1000 working hours, the light output was approximately 34 lm/W. The quantum yield for VUV light is approximately 70%.

What is claimed is:

1. A gas discharge lamp for dielectrically impeded discharges, said gas discharge lamp comprising:

a discharge vessel filled with a gas filling, said discharge vessel including an outer wall of a dielectric material and having a surface which is at least partly transparent to visible radiation and coated with a phosphor layer, wherein the phosphor layer includes a phosphor having a host lattice, $Eu^{2+}$ as the activator and a doping D selected from the group formed by $Ce^{3+}$, $Pr^{3+}$ and $Tb^3$;

an electrode structure for a dielectrically impeded discharge, said electrode structure including a pair of striped-shaped electrodes which are arranged on an outer surface of said discharge vessel and electrically isolated from each other; and means for igniting and maintaining the discharge.

2. The gas discharge lamp as claimed in claim 1, wherein the host lattice is composed of an inorganic material selected from the group formed by oxides, sulphides, halogenides, aluminates, gallates, thiogallares, phosphates, borates and silicates.

3. The gas discharge lamp as claimed in claim 1, wherein the phosphor is selected from the group formed by $BaMgAl_{10}O_{17}:Eu^{2+},D$; $BaMgAl_{10}O_{17}:Eu^{2+},Mn,D$; $(Sr,Ba)MgAl_{10}O_{17}:E^{2+},D$; $BaMgAl_{16}O_{27}:Eu^{2+},D$; $BaMgAl_{14}O_{23}:Eu^{2+}$, $DCaAl_{12}O_{19}:Eu^{2+},D$; $SrAl_{12}O_{19}:Eu^{2+},D$; $SrAl_2O_4:Eu^{2+},D$; $(Ca,Sr,Ba)_5(PO_4)_3Cl:Eu^{2+},D$; $Sr_5(PO_4)_3Cl:Eu^{2+},D$; $Ba_3MgSi_2O_3:Eu^{2+},D$; $BaF(Cl,Br):Eu^{2+},D$ and $SrGa_2S_4:Eu^{2+},D$.

4. The gas discharge lamp as claimed in claim 1, wherein the phosphor layer includes $BaMgAl_{10}O_{17}:Eu^{2+},D$; $Zn_2SiO_4:Mn^{2+}$ and $(Y,Gd)BO_3:Eu^{3+}$.

5. The gas discharge lamp as claimed in claim 1, wherein the phosphor layer includes $BaMgAl_{10}O_{17}:Eu^{2+},D$; $(Y,Gd)BO_3:Tb^{3+}$ and $(Y,Gd)BO_3:Eu^{3+}$.

6. The gas discharge lamp as claimed in claim 1, wherein said discharge vessel further includes an inner wall having the surface which is at least partly transparent to visible radiation and coated with a phosphor layer.

7. The gas discharge lamp as claimed in claim 6, wherein said electrode structure extends through said outer wall to said inner wall and is connected to said electrode structure.

* * * * *